United States Patent [19]

Klein

[11] Patent Number: 5,640,927

[45] Date of Patent: Jun. 24, 1997

[54] NECTAR FEEDER ACCESS DEVICE

[76] Inventor: Arnold G. Klein, P.O. Box 724, Sandia Park, N.M. 87047

[21] Appl. No.: 435,537

[22] Filed: May 5, 1995

[51] Int. Cl.$^6$ .................................................. A01K 39/02
[52] U.S. Cl. .................................................. 119/72
[58] Field of Search .................. 119/57.8, 57.9, 119/52.3, 72, 77

[56] References Cited

U.S. PATENT DOCUMENTS 3,125,069 3/1964 Fowler ........................ 119/77
3,913,527 10/1975 Kiham ........................ 119/77
4,558,662 12/1985 Peterson ...................... 119/77
5,062,390 11/1991 Bescherer et al. ............. 119/72

*Primary Examiner*—Robert P. Swiatek
*Assistant Examiner*—Yvonne R. Abbott
*Attorney, Agent, or Firm*—DeWitt M. Morgan

[57] ABSTRACT

A restrictive access device for use on various nectar type bird feeders, which presents an effective physical barrier to the entry of insects, but which is easily penetrated by a bird's bill. The device consisting of a resilient access housing, configured in such a way so as to support, in a normally closed condition, an access insert, which effectively prevents insect entry, but which is easily penetrated by a bird's bill.

20 Claims, 6 Drawing Sheets

NECTAR FEEDER ACCESS DEVICE

FIELD OF THE INVENTION

The present invention relates to an access device for bird feeders. More specifically, the present invention relates to a feeder access device that acts to restrict insects from feeding at and/or contaminating nectar type bird feeders.

BACKGROUND OF THE INVENTION

Insect feeding and contamination of nectar feeders is a familiar problem and numerous attempts have been made to deter insects from feeding and contaminating nectar feeders. The most frequently used approach is to use a liquid filled moat to prevent crawling insects from reaching the feeder. These moats are either hung interposed as in "Insect Trap for a Bird Feeder" of Hiday, U.S. Pat. No. 4,980,990 or incorporated as a portion of the feeder as in "Hummingbird Feeder" of Queen, U.S. Pat. No. 3,301,220. These moat designs require regular refiling, unpleasant cleaning, and do not protect the feeder from flying insects. Bee and ant guards are incorporated in the "Hummingbird Feeding Device" of Fowler U.S. Pat. No. 3,125,069.

Another disclosure, although not related to nectar feeders, is U.S. Pat. No. 3,558,022 to Zytko et al. disclosing a "Container Safety Closure" that is penetrated with a dispensing dropper. The structure of this device is unsuitable for use in protecting nectar feeders from contamination for a number of reasons. First, the device is intended to form a tight hermetic seal and, as such, it would require a relatively high displacement force to allow for the penetration of a bird bill. Second, along with this high displacement force, and due to the high frictional coefficient of resilient materials, there would be a large frictional resistance to the penetration and withdrawal of a bird's bill. Third, the structure of the device would serve to trap insects at its lowest point, once there, they would have a high probability of being introduced into the feeder by a penetrating bill. Finally, the structure of the device does not lend itself to installation on any known nectar feeder type.

Whatever precise merits, features, and advantages of the above cited references, none of them achieves or fulfills the purpose of the Nectar Feeder Access Device of the present invention.

The principal object of the present invention is to provide a simple device to be installed on nectar feeders which will permit easy penetration of the bird's bill while restricting the entry of any insect life.

It is also the object of the present invention to provide such a device as can be readily installed on many of the popular nectar feeder configurations.

A further object is to provide a device which is simple, reliable, and inexpensive to manufacture.

SUMMARY OF THE INVENTION

A restrictive access device for insertion in a feeding opening formed in the body of a nectar-type bird feeder. The restrictive access device includes an annular housing defining an opening and a plurality of panels interposed circumferentially within the annular housing to close the opening. Each of the panels has a first end, a second end, an interior surface and an exterior surface. The first ends are interconnected to the annular housing. The exterior surfaces are of low friction to facilitate displacement of the panels when engaged by a birds' bill. Each of the panels, which is biased to close the opening, is interconnected to the annular housing by a hinge, preferably one that is integrally formed with each of the panels and the annular housing. Preferably, the bird feeder restrictive access device includes an insert, the insert including a ring portion and the plurality of panels which close the opening. The annular housing includes an annular internal groove for positioning the insert over the opening. When used with an insert, the annular housing includes a plurality of resilient appendages circumferentially positioned adjacent to the annular internal groove, whereby the appendages engaging the panels on the insert and bias the insert panels to close the opening. Preferably, the panels are triangular shaped; the second ends approximating points.

The restrictive bird feeder device may be held in position a number of ways. In one embodiment the annular housing has a first annular lip and a second annular lip interconnected by an external annular groove. In this embodiment the first and second lips are adapted to engage the interior and exterior surfaces on the feeder body to hold the annular housing in the feeding opening. In an alternate embodiment the annular housing includes a disk portion and a cylindrical skirt portion, with the skirt portion having an exterior surface adapted to cooperate with a conventional bee guard type feeding opening. In a third embodiment the annular housing includes a cylindrical skirt portion, where skirt portion has a cylindrical surface adapted to engage the open end of a conventional inverted type feeder tube. In this latter embodiment, the annular housing includes a device (such as check ball) for relieving pressure over an inverted type feeder food reservoir.

In one embodiment the panels are formed of resilient material which tends to maintain them in the closed position. The low friction exterior surface may be a coating on said panels. Alternately, the low friction exterior surface is provided by an insert of low friction material, which insert is positioned over and in contact with the panels.

The design acts to prevent insect pests from gaining access, while offering little resistance to the penetration and withdrawal of a bird's bill. Another advantage to the designs, is that with a two piece assembly, the central insert is easily replaced. A further advantage is that the surrounding resilient material allows the device to be configured in any number of bird attracting, floral designs, all easily installed on most feeder configurations.

Other and further objects of the present invention will be apparent from the following description and claims, and are illustrated in the accompanying drawings, which by way of illustration, show a preferred embodiment of the present invention and the principles thereof, and what is now considered to be the best mode in which to apply these principles. Other and different embodiments of the invention embodying the same or equivalent principles may be used and structural changes may be made as desired by those skilled in the art without departing from the invention.

DETAILED DESCRIPTION

Figure 1:
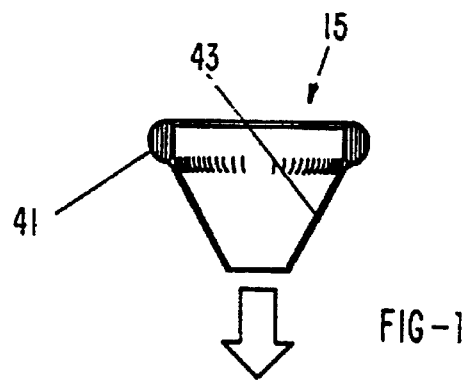
FIG. 1 depicts a side cross sectional view of the insert for the nectar feeder access device of the invention.
Figure 2:
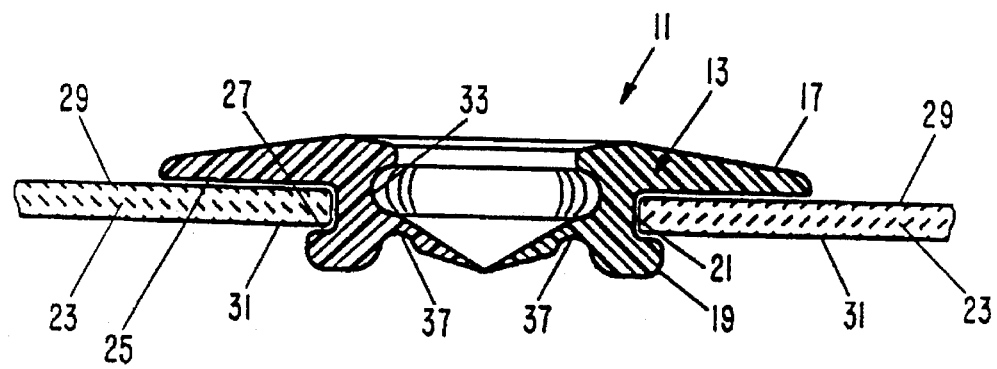
FIG. 2 depicts a side cross sectional view of the nectar feeder access device of the invention.

With reference to FIGS. 1–4, access device 11 includes an annular housing 13 and an insert 15. Housing 13, which is made of a resilient material (such as silicone, neoprene, or urethane), includes an outer lip 17 and an inner lip 19 which are interconnected by an exterior annular groove 21. The width of the groove 21 is approximately equal to the thickness of feeder body 23 (of a typical nectar-type bird feeder), whereby surfaces 25 and 27 are in engagement with feeder body surfaces 29 and 31. Housing 13 also includes an interior annular groove 33 and a plurality of pie-shaped panels $35^1$, $35^2$, and $35^3$ which are naturally biased towards the closed position as illustrated in FIG. 2.

Figure 4:
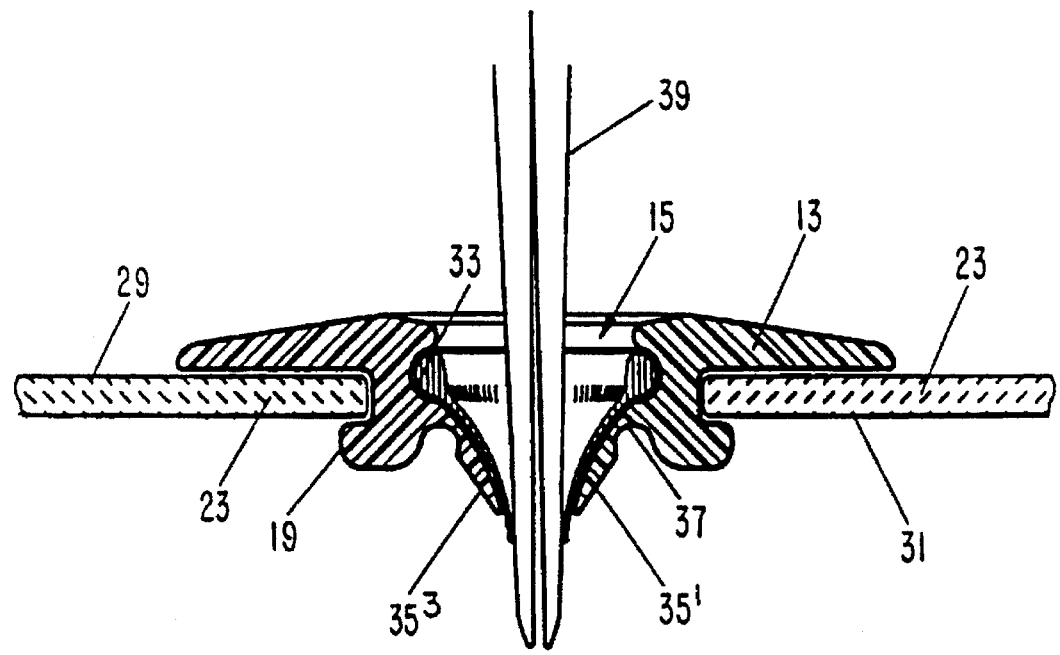
FIG. 4 depicts a side cross sectional view of the nectar feeder access device of FIG. 3 being penetrated by a bird's bill.

Undercut groove 37 reduces the thickness of the material where panels $35^1$, $35^2$, and $35^3$ join housing 13 and, in effect, forms a hinge, to permit the panels to be pushed inward by the force of a hummingbird's bill 39, as illustrated in FIG. 4. Finally, because hummingbirds are extremely sensitive to any surface friction encountered by their bill and, in fact, will not attempt to push panels $35^1$, $35^2$, and $35^3$ aside if any surface friction is encountered (such as is typical of resilient materials), it is necessary that the exterior surface of the panels $35^1$, $35^2$, $35^3$, or insert surface 15 be of low friction. This can be accomplished by using a specially formulated resilient material having low friction characteristics, using a low friction coating, such as Teflon, to coat the panels $35^1$, $35^2$, and $35^3$, or finally, providing tapered cylinder 43, formed of low friction material.

Figure 3:
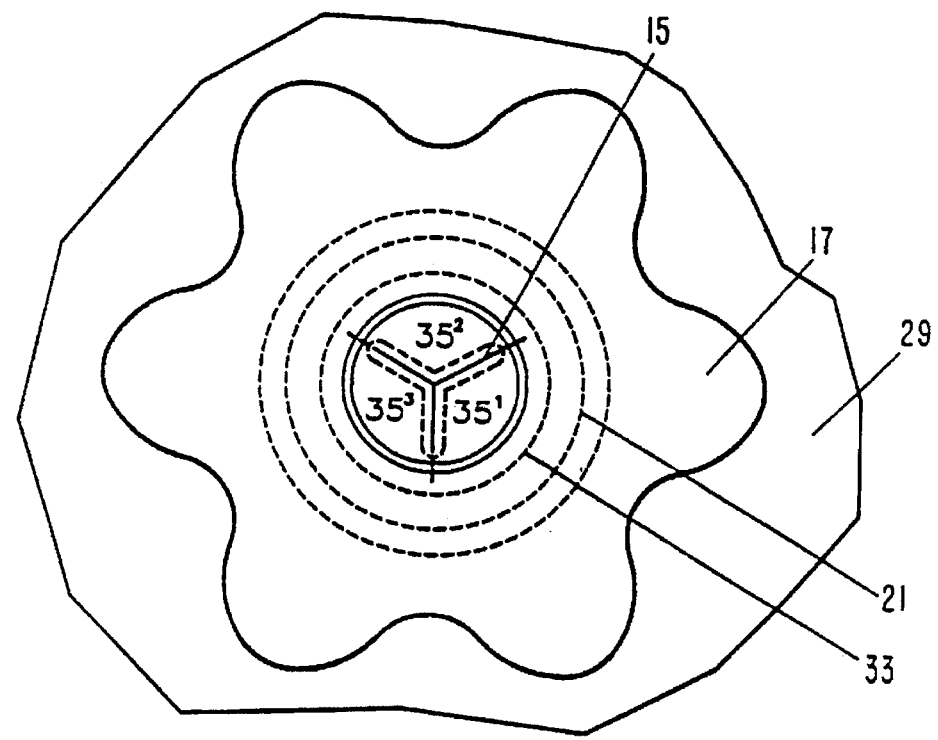
FIG. 3 depicts a top view of the nectar feeder access device of FIG. 2.

Insert 15 is made of a low friction, compliant material and, in its free state has the shape of a thin walled, tapered cylinder 43. Insert 15 has a thickened lip 41 at the larger end, which lip is received in interior annular groove 33. The wall of cylinder 43 is, in the closed position, pinched by the resilient action of panels $35^1$, $35^2$, and $35^3$ in three locations, as best illustrated in FIG. 3, by the opposing edges of panels $35^1$–$35^2$, $35^2$–$35^3$, and $35^3$–$35^1$.

Penetration of the nectar feeder access device by the hummingbird bill 39 is illustrated in FIG. 4. Bill 39 passes easily into the device by pushing the resilient panels $35^1$, $35^2$, and $35^3$ downward. When the bill is withdrawn, the device returns to the naturally biased, closed position as shown in FIG. 3.

Figure 5:
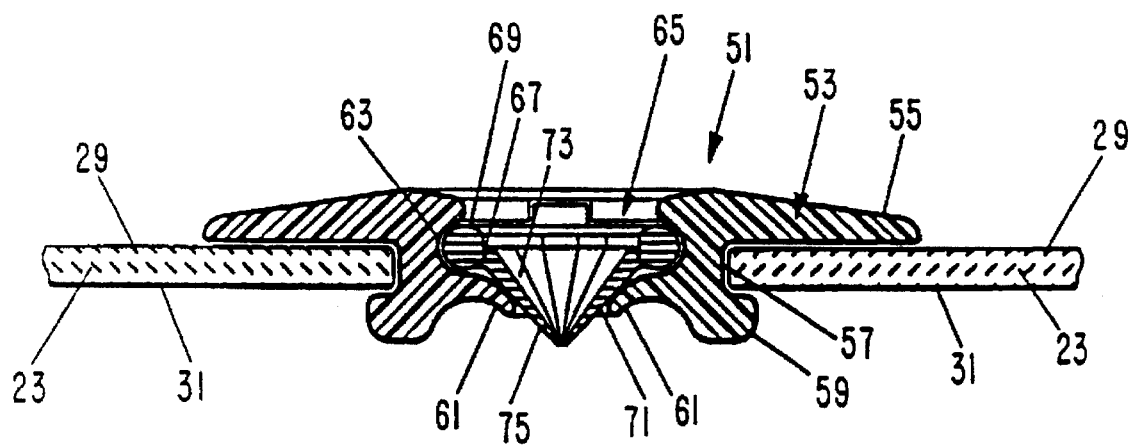
FIG. 5 depicts a side cross sectional view of a second embodiment of the nectar feeder access device of the invention.
Figure 6:
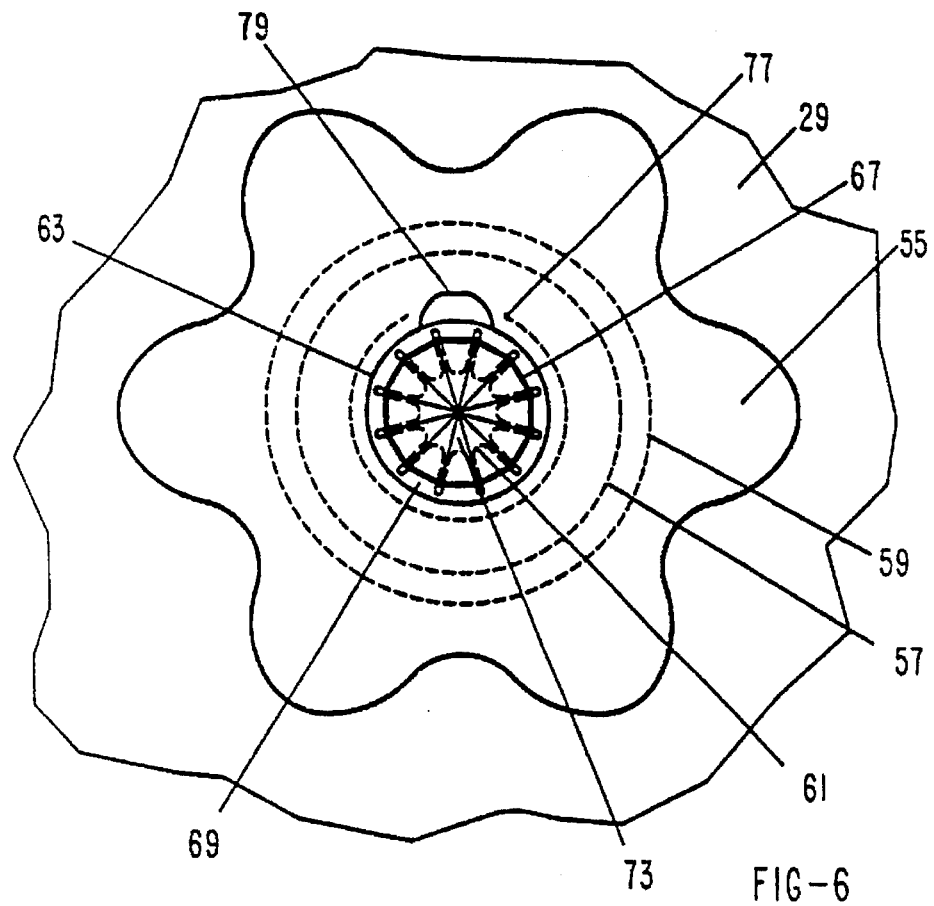
FIG. 6 depicts a top view of the nectar feeder access device of FIG. 5.
Figure 7:
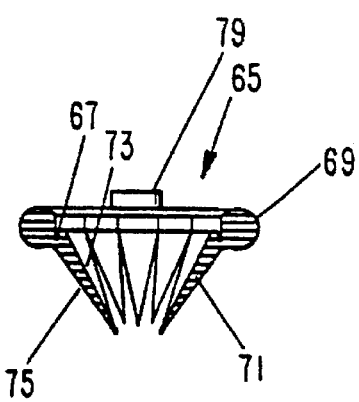
FIG. 7 depicts a side cross sectional view of the removable access insert of the nectar feeder access device of FIG. 5.
Figure 8:
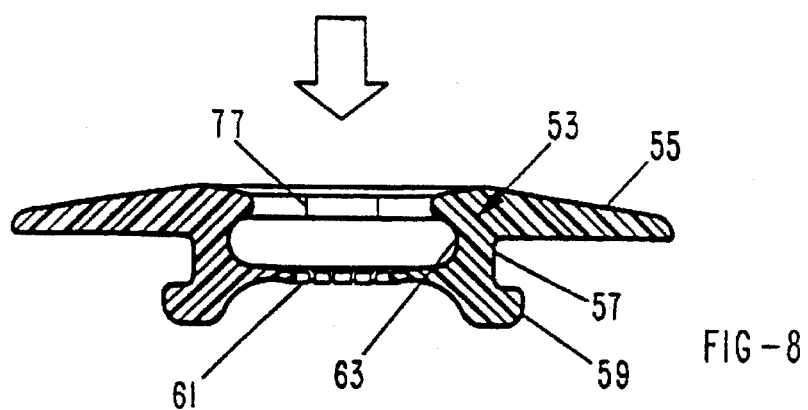
FIG. 8 depicts a side cross sectional view of the resilient housing of the nectar feeder access device of FIG. 5.
Figure 9:
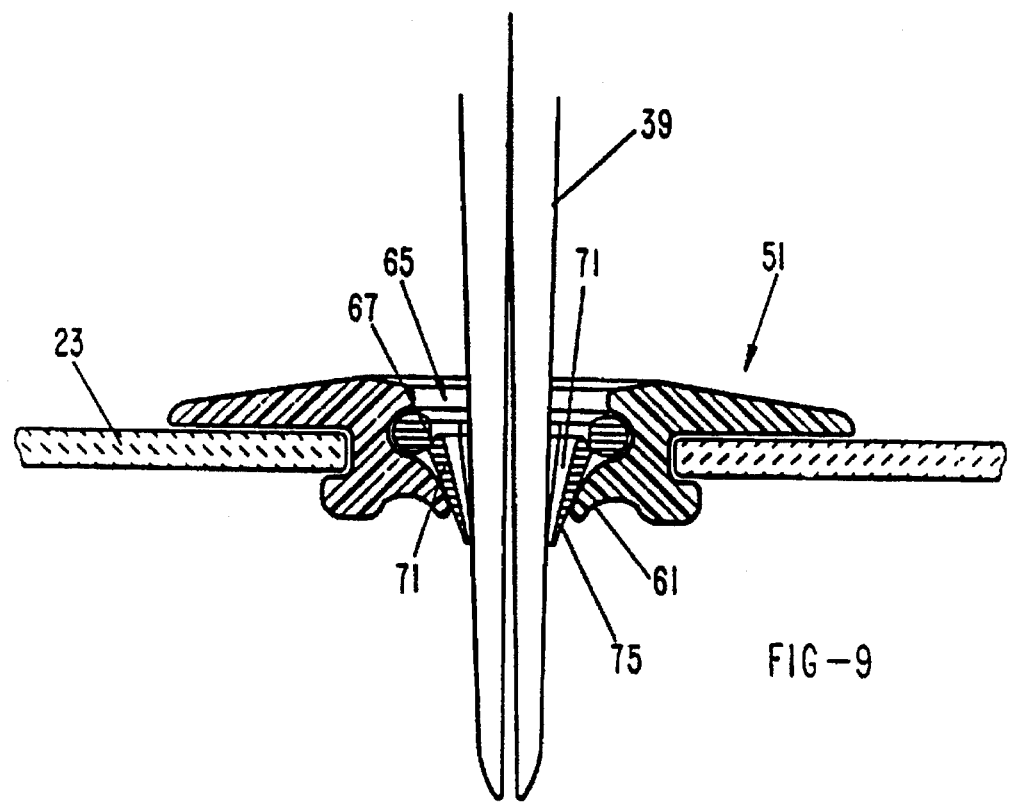
FIG. 9 depicts a side cross sectional view of the nectar feeder access device of FIG. 5 being penetrated by a bird's bill.

With reference to FIGS. 5–9, a second embodiment of the nectar feeder access device 51 includes an annular housing 53 and insert 65. Housing 53, which is made of a resilient material, includes an outer lip 55 and an inner lip 59 which are interconnected by an exterior annular groove 57. The width of the groove 57 is approximately equal to the thickness of the feeder body 23. As shown in FIGS. 5 and 8, housing 53 includes an interior annular groove 63 and a plurality of triangular shaped appendages 61 located immediately below. The interior annular groove 63 is shaped to accept access insert 65. This insert 65 is comprised of a an external ring 69 connected to a series of triangular panels 71 through a reduced cross sectional area 67, which acts as an integral hinge. When the insert 65 is seated into the housing 53, the resilient appendages 61 contact the interior surface 75 of the triangular panels 71, biasing them to closure. Alignment of the insert panels 71 and the supporting resilient appendages 61, is maintained by a node 79 on the insert ring, fitted into a slot 77 in the housing. In order to facilitate penetration of the hummingbird's bill 39, as seen in FIG. 9, the exterior surface 73 of the insert panels are made of, or coated, with a low friction material such as Teflon. When the birds bill 39 is withdrawn from the access device 51, the device returns to the naturally closed position as seen in FIG. 5.

Figure 10:
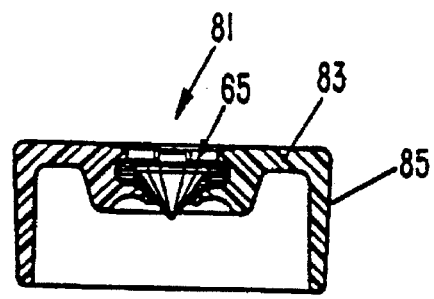
FIG. 10 depicts, on a different scale, a side cross sectional view of the nectar feeder access device configured to fit in place of a conventional bee guard.
Figure 11:
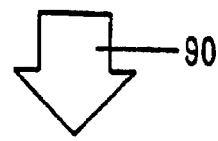
FIG. 11 depicts a side cross sectional view of a conventional hummingbird feeder flower cup.
Figure 11:
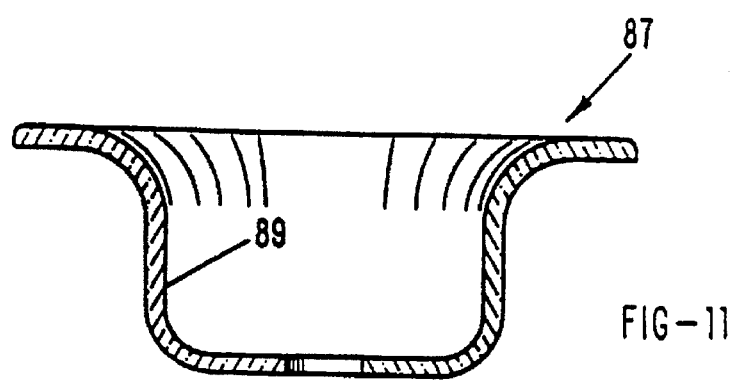
Figure 12:
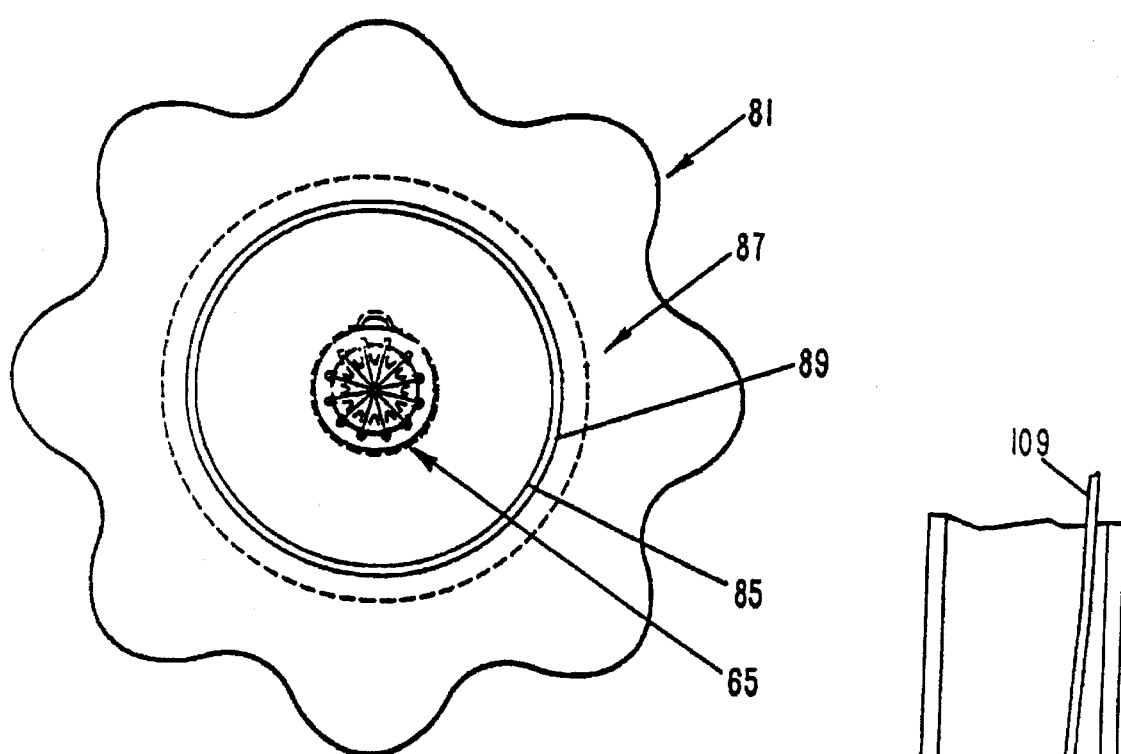
FIG. 12 depicts a top view of the nectar feeder access device of FIG. 10 and the conventional hummingbird feeder flower cup of FIG. 11 assembled.
Figure 13:
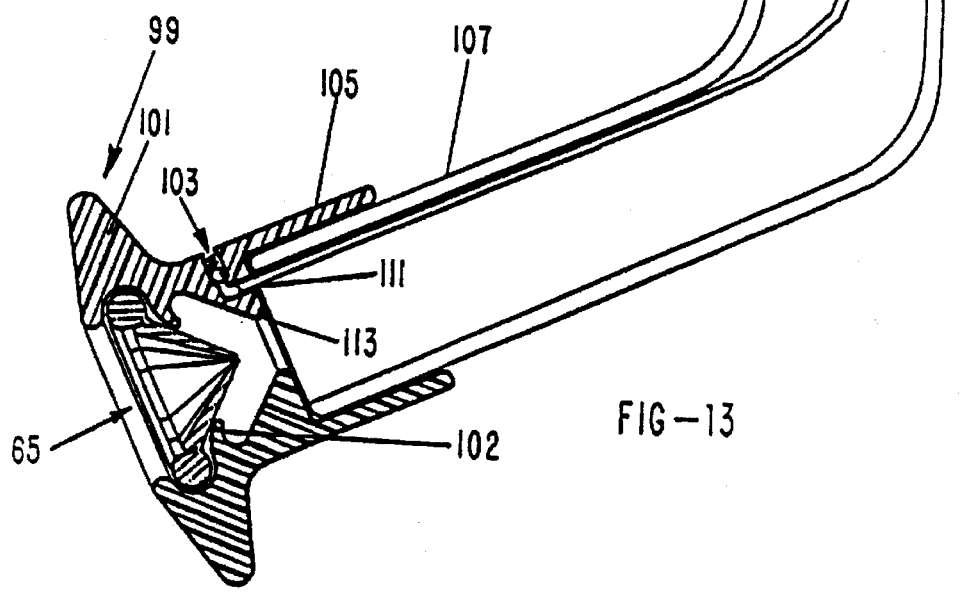
FIG. 13 depicts, on a different scale, a side cross sectional view of the nectar feeder access device configured to fit an inverted type tube feeder.

Referencing FIGS. 10–12 there is shown an embodiment of the nectar feeder access device 81 adapted to fit within a plastic flower cup 87, in place of a conventional bee guard. Restrictive access device 81, functions to limit access, as the device of FIG. 5, the only difference, being the way it is mounted to the feeder. Thus, insert 65 is utilized and the structure for holding insert 65 in place is identical to that disclosed in the second embodiment. The resilient housing 83 of the device 81 is configured in the form of a disk with a vertically extending skirt 85, sized to form an interference fit with the side walls 89 of the plastic flower cup 87. The access device 81 is attached, by pushing it into the plastic flower cup 87, as shown by arrow 90. The resulting assembly is shown in FIG. 12.

Figure 14:
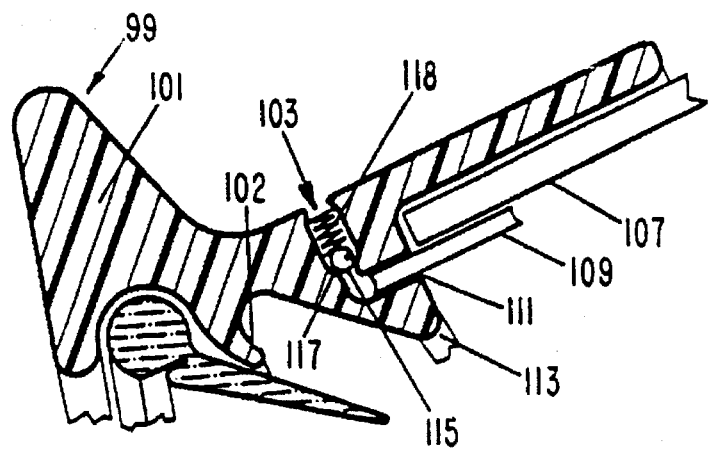
FIG. 14 depicts an enlarged view of the check valve (in its closed position) of the device of FIG. 13.
Figure 15:
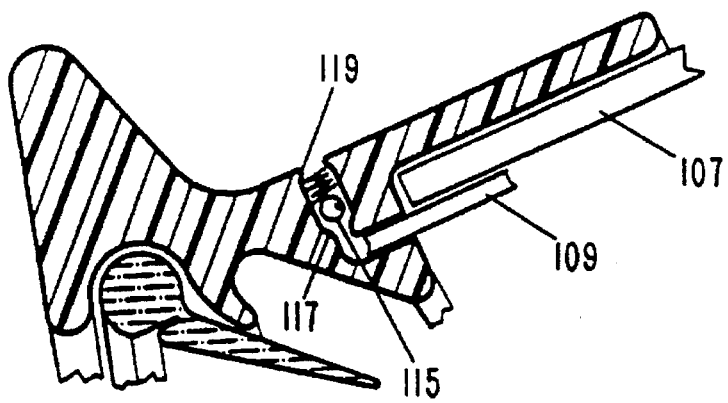
FIG. 15 depicts an enlarged view of the check valve (in its open position) of the device of FIG. 13.
Figure 16:
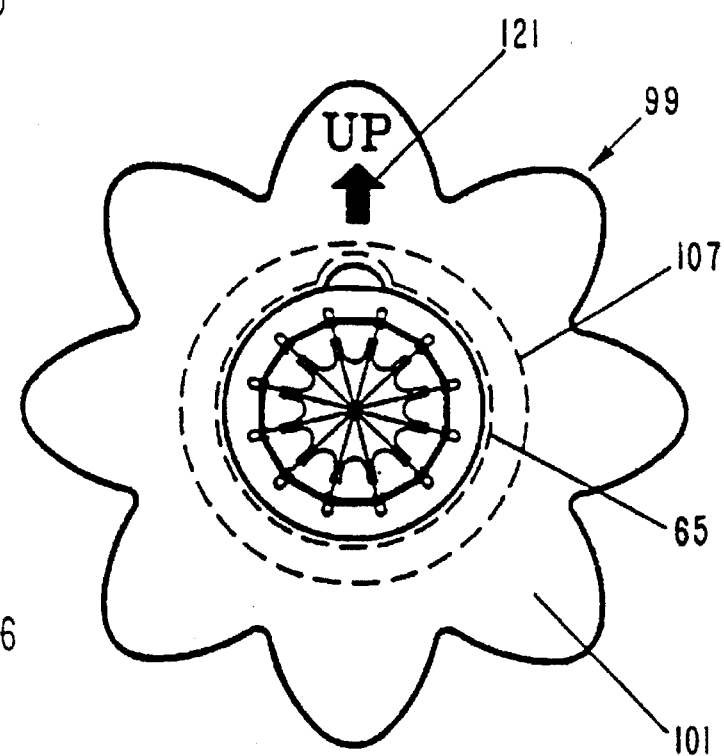
FIG. 16 depicts a frontal view of the device of FIG. 13.

Finally, with reference to FIGS. 13–16 there is shown the nectar feeder access device 99 configured to fit the tube of an inverted type nectar feeder. The device 99 functions, to limit access, as the device of FIG. 5 (by incorporating insert 65), but is shaped to fit the feeder tube 107, and incorporates an integral pressure relieving valve 103. Resilient housing 101 includes an extended skirt 105 that is sized to fit snugly over the feeder tube 107. Nectar feeder access device 99 incorporates an integral pressure relieving valve 103 to reduce the dripping that typically occurs with inverted type feeders. Dripping results due to rising ambient air temperatures and the resultant expansion of the air in the space above the nectar reservoir (not shown). This expansion forces nectar from the feeder reservoir, out through feeder tube 107. To relieve this pressure, a breather tube 109 extends from the air space above the nectar to an opening 111 in the housing 101. Breather tube 109 is interference fitted with the opening 111, that connects to the outside air through an integrally formed valve seat 117, and check ball 115, as seen in FIG. 14. Under normal, reduced pressure conditions, check ball 115 maintains an airtight seal on the valve seat 117. In times of increasing ambient temperatures, positive pressure above the nectar reservoir, passes through the breather tube, lifting check ball 115 off the valve seat 117, against gravity or very light spring 118, as seen in FIG. 15. Check ball 115 and spring 105 are retained in the housing 101 by pushing them past the reduced diameter lip 119. Reduced diameter feeder opening 113 is incorporated into the resilient housing 101, to allow for sufficient pressure to build above the nectar reservoir, to open the valve 103, before significant dripping occurs. FIG. 16 shows a graphic symbol 121 that is used to show the correct orientation of the device 99, when gravity alone, is used, to seat the check ball 115. Panels 71 are biased into the closed position by resilient appendages 102.

It should be noted that for all the embodiments, the size of the nectar feeder access insert 15, 65 will vary from relatively small for hummingbird applications, approximately ¼" diameter, up to almost ½" diameter for use on oriole feeders.

Others may practice this invention in any of the numerous ways which will be suggested to one skilled in the art upon reading this disclosure. All such practice of the invention is considered to be covered hereby provided it falls within the scope of the appended claims.

I claim:

1. A restrictive access device for insertion in a feeding opening formed in a body of a nectar-type bird feeder, said feeder body having interior and exterior surfaces, said restrictive access device comprising:

a) an annular housing defining an opening and a plurality of panels interposed circumferentially within said annular housing to close said opening, each of said plurality of panels having a first end, a second end, an interior surface and an exterior surface, said first ends of said panels interconnected to said annular housing, said exterior surface having low friction to facilitate displacement when engaged by a bird's bill;

b) means for biasing said panels to close said opening; and c) means for positioning said device over said feeding opening to restrict access to said nectar-type bird feeder.

2. The bird feeder restrictive access device of claim 1, wherein said panels incorporate said biasing means by being formed of resilient material which tends to maintain said panels in said closed position.

3. The restrictive bird feeder device of claim 1, wherein said panels are triangular shaped, said second ends approximating points.

4. The bird feeder restrictive access device of claim 1, wherein each of said panels is interconnected to said annular housing by a hinge means.

5. The bird feeder restrictive access device of claim 4, wherein said hinge means is integrally formed with each of said panels and said annular housing.

6. The bird feeder restrictive access device of claim 5, wherein said panels incorporate said biasing means by being formed of resilient material which tends to maintain said panels in said closed position.

7. The bird feeder restrictive access device of claim 6, wherein said low friction exterior surface is a coating on said panels.

8. The bird feeder restrictive access device of claim 6, wherein said low friction exterior surface is provided by an insert of low friction material, said annular housing including means to position at least a portion of said insert over and in contact with said panels.

9. The bird feeder restrictive access device of claim 1, wherein said means for positioning said restrictive access device includes at least one surface on said annular housing, said surface adapted to cooperate with surface engaging means on said feeder body.

10. The bird feeder restrictive access device of claim 1, wherein said restrictive access device includes an insert, said insert including a ring portion and said plurality of panels, and means on said insert and said annular housing for positioning said insert over said opening.

11. The restrictive bird feeder device of claim 10, wherein said annular housing has an annular internal groove, and wherein said means for positioning said insert includes a surface on said insert, said surface adapted to cooperate with said annular internal groove.

12. The restrictive bird feeder device of claim 11, wherein said annular housing includes a plurality of resilient appendages circumferentially positioned adjacent to said annular internal groove, said appendages engaging said panels and constituting said means for biasing said panels to close said opening.

13. The restrictive bird feeder device of claim 12, wherein said panels are triangular shaped, said second ends approximating points.

14. The restrictive bird feeder device of claim 10, wherein said annular housing has a first annular lip and a second annular lip, said first and second lips being interconnected by an external annular groove, said first and second lips adapted to engage said interior and exterior surfaces on said feeder body to hold said annular housing in said feeding opening.

15. The restrictive bird feeder device of claim 10, wherein said annular housing includes a disc portion and a cylindrical skirt portion, said skirt portion having an exterior surface adapted to cooperate with a conventional bee guard type feeder opening.

16. The restrictive bird feeder device of claim 10, wherein said annular housing includes a cylindrical skirt portion, said skirt portion having a cylindrical surface adapted to engage an open end of a conventional inverted type feeder tube.

17. The restrictive bird feeder device of claim 16, wherein said annular housing includes a means for relieving pressure over an inverted type feeder food reservoir.

18. The restrictive bird feeder device of claim 17, wherein said annular housing includes a breather tube adapted to extend to the air space over an inverted type feeder food reservoir.

19. The restrictive bird feeder device of claim 18, wherein said annular housing includes a pressure relieving valve connected to said breather tube.

20. The restrictive bird feeder device of claim 17 wherein said pressure relieving valve uses a check ball and an integral valve seat formed in said annular housing.

* * * * *